United States Patent [19]

Cady et al.

[11] 3,924,315

[45] Dec. 9, 1975

[54] APPARATUS FOR REMOVING PILFERPROOF CLOSURE BANDS FROM RETURNABLE BOTTLES

[75] Inventors: Edward W. Cady, Richmond; George R. Parsons, Hagerstown, both of Ind.

[73] Assignee: Aluminum Company of America, Pittsburgh, Pa.

[22] Filed: Mar. 7, 1974

[21] Appl. No.: 448,979

[52] U.S. Cl. .................... 29/200 D; 29/426; 83/914
[51] Int. Cl.² ........................................ B23P 19/00
[58] Field of Search...... 29/200 D, 427, 200 R, 426; 83/923, 914; 30/134; 53/381, 381 A

[56] References Cited
UNITED STATES PATENTS

| | | | |
|---|---|---|---|
| 1,175,697 | 3/1916 | Braun | 29/200 D |
| 1,604,004 | 10/1926 | Warner | 30/134 |
| 3,101,688 | 8/1963 | Negola et al. | 29/200 D X |
| 3,284,896 | 11/1966 | Kjennerud | 30/134 |
| 3,689,973 | 9/1972 | Leenaards | 29/200 D |
| 3,775,829 | 12/1973 | Rice | 29/426 |

*Primary Examiner*—Victor A. DiPalma
*Attorney, Agent, or Firm*—David W. Brownlee, Esq.

[57] ABSTRACT

Apparatus is disclosed for removing pilferproof closure bands from the necks of returnable bottles which includes a rotary table with a plurality of cutter assemblies mounted in it and a rotary star wheel for moving bottles around a portion of the apparatus for removal of the bands from the bottles. Each cutter assembly includes a pair of hinged jaws which are adapted to have their outer ends engaged against a bottle neck above and below a metal band on the neck and close against the metal band to sever it between mating sharp edges on the jaws and clamp it between mating dull edges on the jaws so the band will be stripped from the bottle when it is discharged from the apparatus. The separated band is dropped from the jaws when they are subsequently opened at a predetermined location.

14 Claims, 7 Drawing Figures

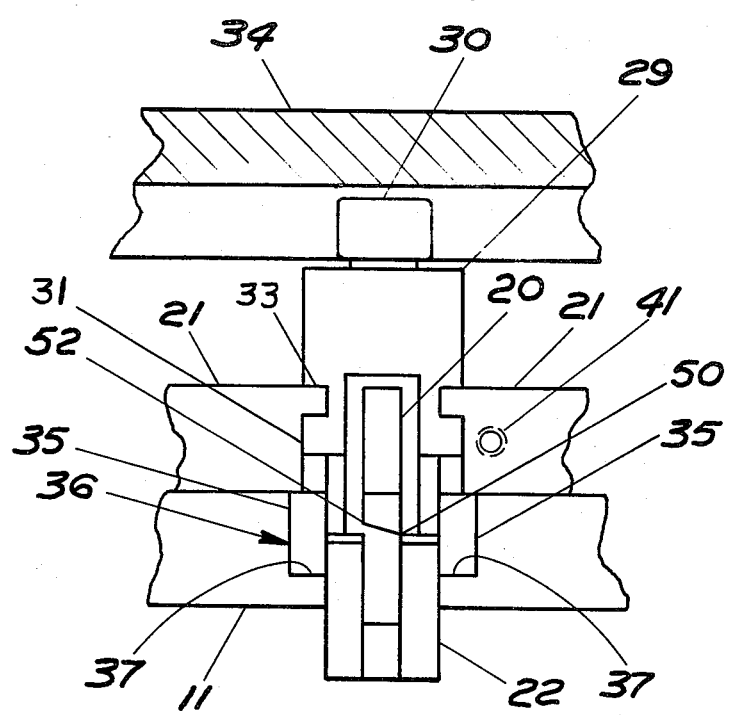
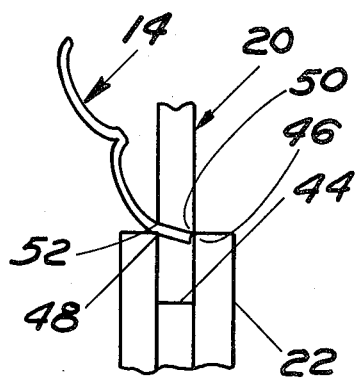
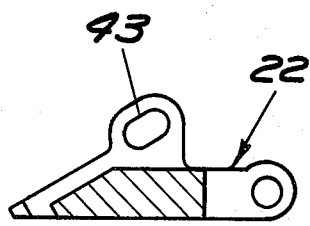
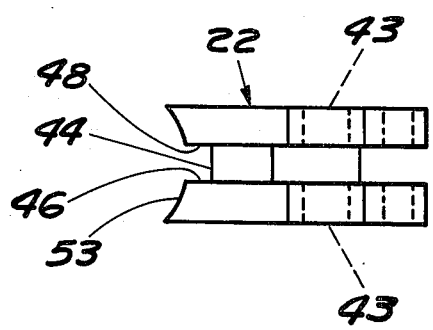
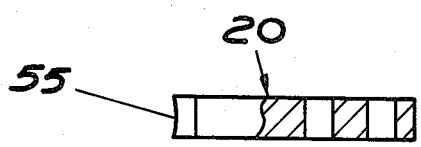

APPARATUS FOR REMOVING PILFERPROOF CLOSURE BANDS FROM RETURNABLE BOTTLES

BACKGROUND OF THE INVENTION

1. Field of Art

This invention relates to apparatus for removing pilferproof closure bands from the necks of returnable bottles.

2. Brief Description of the Prior Art

Pilferproof screw caps for bottles are in extremely wide use throughout the world. These pilferproof screw caps are of a variety of types, with one popular type comprising a threaded metal cap with a pilferproof or sealing ring or band below the threaded portion of the cap and attached thereto by means of a plurality of frangible bridges. When these caps are removed from their bottles, the frangible bridges fracture leaving the pilferproof ring on the bottles. If the bottle is to be returned for reuse, the metal pilferproof band must be removed from the bottle before such reuse. Heretofore, the pilferproof bands have been removed from bottles by a variety of methods such as by cutting them off by hand or mechanically removing the bands from the bottles as is disclosed in U.S. Pat. No. 3,689,973. According to that patent, the pilferproof band or ring remaining on the bottle neck after removal of the cap is pushed or forced down the neck of the bottle by means of protrusions on a rotating spindle to break the ring and remove it from the bottle.

The prior art is lacking in a disclosure of apparatus for mechanically cutting pilferproof rings or bands on the necks of containers, stripping of the bands from the containers and depositing them at a predetermined location.

SUMMARY OF THE INVENTION

This invention provides apparatus for removing pilferproof bands from the neck of returnable bottles which includes a plurality of cutter assemblies each of which has a pair of hinged jaws having sharp edges for cutting a pilferproof band and dull edges for clamping the band to strip it from the bottle neck. The cutter assemblies are mounted on a rotary table and associated cam means is provided for closing the jaws with their outer ends engaged against a bottle neck above and below a pilferproof band on the neck to cut the band and clamp it between the jaws so the band will be stripped from the bottle neck when the bottle exits from the apparatus.

Accordingly, an object of this invention is to provide apparatus for removing pilferproof bands from the necks of returnable bottles.

Another object of this invention is to provide means for severing and clamping a pilferproof band on a container neck and stripping the band from the neck.

A further object of this invention is to provide cutter assemblies which include a pair of hinged jaws with mating sharp edges and mating dull edges for cutting and clamping a pilferproof band on a bottle neck.

Another object of this invention is to provide means for resiliently engaging a bottle neck with the outer ends of a pair of cutter jaws to accommodate variations in the size and position of bottle necks.

The above and other objects and advantages of this invention will be more fully understood and appreciated with the reference to the following description and the drawings attached hereto.

BRIEF DESCRIPTION OF THE DRAWINGS

FIG. 3 is an elevational view looking radially inwardly toward a cutter assembly of FIGS. 1 and 2.

FIG. 4 shows a severed pilferproof band clamped between the jaws of the cutter assembly of FIG. 3.

FIG. 5 is a cross section through the lower jaw of a cutter assembly.

FIG. 6 is a top view of the jaw illustrated in FIG. 5.

FIG. 7 is a top view in partial section of the upper jaw in a cutter assembly.

DESCRIPTION OF A PREFERRED EMBODIMENT

Figure 1:
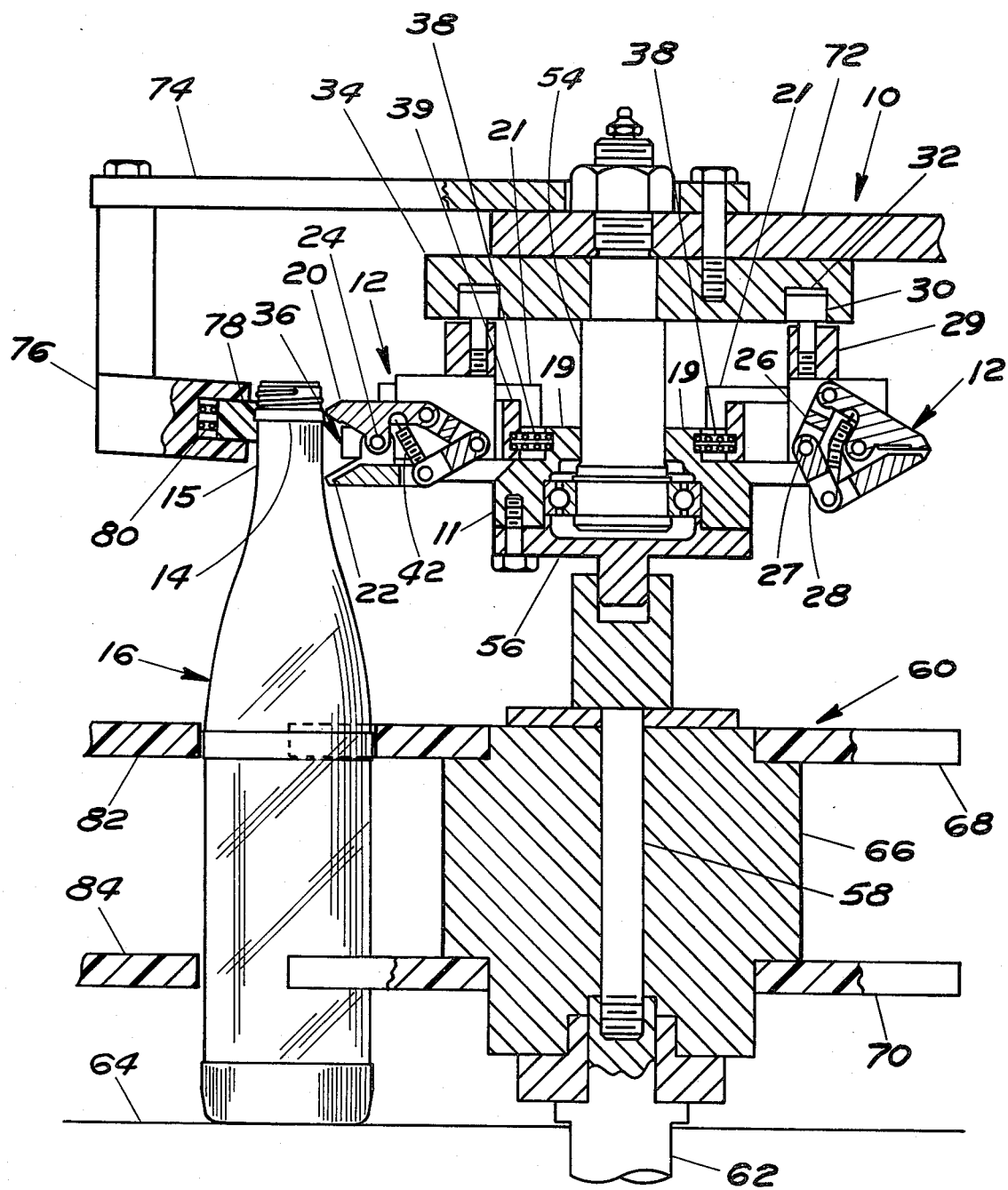
FIG. 1 is a partial cross section through apparatus of this invention showing engagement of the outer ends of a pair of cutter jaws against the neck of a bottle preparatory to severing and clamping a pilferproof band on the bottle neck.

In accordance with this invention, apparatus for removing pilferproof bands from bottles is provided, which will be called a debander or de-ringer for short, and which is adapted for use in conjunction with apparatus for removing caps from the bottles, which will be called a decapper for short. Debander 10 includes a rotary table 11, which has at least one, and preferably several, cutter assemblies 12 mounted in it for making a transverse cut across a pilferproof ring or band 14 on the neck 15 of a bottle 16 and clamping or seizing the pilferproof ring to strip it from the bottle. The separated band is then deposited by the cutter assembly at a predetermined location.

The table 11 illustrated in the drawings comprises a plate with a center aperture therethrough for receiving a support shaft and bearing, and six guideways in the table extending radially outwardly from a rim 19 on the top of the table around the center aperture. Six cutter assemblies 12 are mounted on the guideways in the table and six gib plates 21 are secured to the top of table 11 between the cutter assemblies to secure them in the table as will be explained.

Each cutter assembly 12 comprises an upper jaw 20 which forms a shear blade and a lower jaw 22 which form an anvil arm. Jaws 20 and 22 are connected through a common pivot pin 24, and also interconnected by means of link members 26 and 28. The link members 26 and 28 are further interconnected through a common pivot pin 27 which is connected through a cam block 29 to a cam follower 30 which moves in a cam track 32 in a stationary cam member 34. The cam track 32 is eccentric with respect to the axis of table 11 for moving the cam followers 30 radially with respect to such axis as the cam followers are rotated with the table.

The cam block 29 has a pair of downward extending arms, not shown, on either side thereof with holes through the ends of the arms through which pin 27 fits for radial movement of the pin when the cam follower 30 moves radially in cam track 32. The cam block 29 further has a pair of radially outwardly extending arms 31 with radially extending grooves in their outer faces in which radially extending ribs 33 on gib plates 21 fit (FIG. 3) for guiding the cam block radially with respect to the center of rotary table 11. Radial movement of the cam follower 30, cam block 29 and pin 27 through links 26 and 28 opens and closes jaws 20 and 22 as will be explained later.

Figure 2:
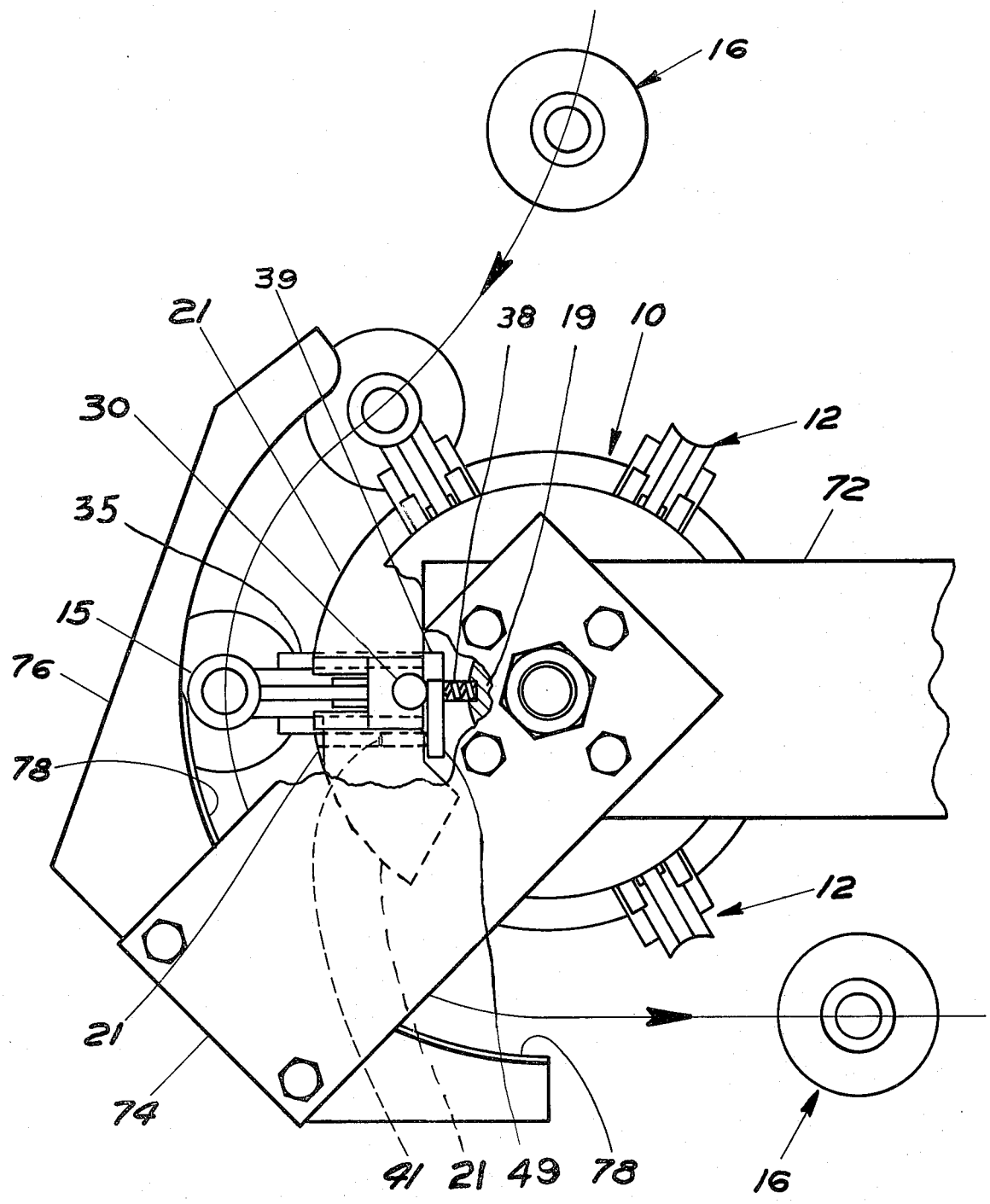
FIG. 2 is a top plan view of the apparatus illustrated in FIG. 1 with part of the apparatus cut away to show the top of one cutter assembly.

Each cutter assembly 12 is secured in its own radially extending guideway in the rotary table 11 by means of a U-shaped yoke 36 having a base 39 and a pair of arms 35. (FIGS. 2 and 3) which extend from the base radially outwardly with respect to the center of table 11. As shown in FIGS. 2 and 3, the arms 35 on yoke 36 fit in grooves 37 in the rotary table 11 on opposite sides of the guideway and are retained therein by gib plates 21 which are bolted to the table between the cutter assemblies with the edges of the gib plates partially overlying the arms 35 on the yoke. A compression spring 38 is mounted between the base 39 on the yoke 36 and the rim 19 on the table 11 to resiliently support the yoke against radially inward movement.

The base 39 of yoke 36 has a stepped configuration with an arm 49 extending laterally from one side of the base behind the gib plate 21 as is illustrated in FIG. 2. The inner end of an adjustment screw 41 through gib plate 21 abuts against the outer face of arm 49 on yoke 36 and holds the arm and yoke against radially outward movement of the yoke and cutter assemblies in the rotary table. Screw 41 can be adjusted to adjust the closing of the jaws 20 and 22 as will be explained. Pivot pin 24 extends through jaws 20 and 22 into the two arms 35 of the yoke 36 to hold the jaws in the guideways resiliently supported against radially inward movement and locked against radially outward movement.

Jaws 20 and 22 are also resiliently interconnected by means of a spring 42 which urges the lower jaw radially outwardly as permitted by a slotted hole 43 (FIG. 5) in the lower jaw through which pin 24 is disposed. This resilient mounting of lower jaw 22 facilitates closing the jaw with its outer end engaged against a bottle neck which may vary in shape and size from bottle to bottle.

In accordance with this invention, lower jaw 22 (FIGS. 4–6) has a radially extending groove 44 in its upper face with exposed edges 46 and 48 along opposite sides of the groove. The edge 46 on one side of groove 44 is sharp and the edge 48 on the other side of the groove is relatively dull or rounded with a small radius. The upper jaw 20 (FIGS. 3, 4 and 7) has an outer edge 50 along one side of its bottom face which is sharp for mating with sharp edge 46 on lower jaw 22, and an outer edge 52 on the other side of the bottom face which is dull or rounded for mating with the dull edge 48 on the lower jaw. When the jaws 20 and 22 are closed toward one another, the mating sharp edges 46 and 50 are adapted to transversely cut a metal pilferproof band to sever it so it can be stripped from the bottle, and the mating dull or rounded edges 48 and 52 are adapted to clamp or seize the pilferproof band to strip it from the bottle when the bottle is discharged or exits from the debander.

The outer ends of jaws 20 and 22 are also especially shaped for engagement against the cylindrical neck of a bottle. As shown in FIGS. 1 and 6, the outer end 53 of lower jaw 22 is concave facing the bottle neck 15 for engagement against the bottle neck on both sides of the groove 44 through the jaw. The outer end 55 of the upper jaw 20 is also concave toward the bottle neck 15 for engagement thereagainst. This engagement of the outer ends of the jaws against the bottle neck ensures that the cutting edges of the jaws are disposed sufficiently radially outwardly to underlie and overlie a pilferproof band 14 on the neck to cut and clamp it between the jaws when they are closed.

As is illustrated in FIG. 1, rotary table 11 is mounted to rotate about a stationary support shaft 54, and is connected to a drive mechanism, not shown, in the base of the debander 10. A disc shaped flange 56 is bolted to the rotary table 11 and is secured to a drive shaft or screw 58 extending downward and fixedly secured in star wheel 60. The bottom end of drive screw 58 is threaded and locked in a drive spindle 62 which is connected to a drive chain or the like, not shown, in the base 64 of the debander. Star wheel 60 includes a hub 66 and upper and lower bottle contact ledges 68 and 70 respectively which have radially outwardly open pockets in them for receiving bottles around the periphery of the star wheel. The contact ledges 68 and 70 are preferably made of nylon or other synthetic rigid plastic material which will not damage bottles which are received and moved in the pockets in the star wheel. When a drive mechanism turns drive spindle 62, this rotates or turns drive screw 58, star wheel 60 and rotary table 11 to rotate bottles positioned in the star wheel and the cutter head assemblies 12 around the axis of the debander 10.

Shaft 54 around which the rotary table 11 rotates is secured to a support plate 72 which is connected to a decapper or other auxiliary apparatus adjacent the debander 10. Cam member 34 is also fixedly secured to support plate 72 to prevent rotation of the cam member about the axis of the debander 10. When the rotary table 11 and cutter assemblies 12 with cam followers 30 connected thereto are rotated about the axis of the debander 10, the cam followers move in the eccentric track 32 in the stationary cam member 34 to open and close the jaws in the cutter assemblies as will be described.

As is illustrated in FIG. 2, a second support plate 74 is connected on the top of support plate 72 and extends laterally from the axis of the debander 10 to a bottle guide support 76 adjacent the rotary table and extending for approximately 150° around the periphery of the rotary table. Guide support 76 has a spring loaded nylon guide strip 78 secured in it and extending for approximately 90° around the debander for engagement against the pilferproof band 14 on container 16 to urge the band toward the cutter assembly 12 on the opposite side of the container. The nylon guide strip 78 is mounted in a groove in guide support 76 with a plurality of compression springs 80 (FIG. 1) behind the guide strip spaced along its length to resiliently support the guide strip in the groove. The bottle 16 is further supported by two outer contact ledges 82 and 84 at approximately the same height as the contact ledges 68 and 70 on star wheel 60 for guiding the bottle as it is rotated around the axis of the debander. These outer contact ledges 82 and 84 are also preferably made of nylon or other rigid plastic material as are the contact ledges on the star wheel.

To accommodate for varying bottle heights, the debanding apparatus can be raised or lowered by raising or lowering support plate 72. When support plate 72 is raised or lowered, the apparatus above flange 56 will be raised as permitted by a sliding engagement between the flange and drive screw 58. Star wheel 60 will remain at the illustrated elevation. Since the bottle guide 76 is connected to the support plate 72, raising the debander, also raises the guide support and nylon guide strip in the support to proper elevation for contact against the pilferproof band on the container neck.

In the operation of a debander constructed in accordance with this invention, the apparatus is preferably mounted adjacent a decapper and will receive bottles as they come from the decapper. Although the debander may rotate either clockwise or counterclockwise, the apparatus selected for illustration is designed for counterclockwise rotation. Bottles are received from the decapper between the bottle guide and rotary head near the top of the plan view of the debander as it is illustrated in FIG. 2, and are discharged from the decapper on its opposite side or near the bottom of FIG. 2.

As is mentioned above, radial travel of the cam followers 30 as they move in eccentric cam track 32 opens and closes the jaws 20 and 22 on each cutter assembly 12. Referring to FIG. 1, this opening and closing of jaws 20 and 22 is produced as a result of radial movement of pin 27 which is connected to the cam block 29 and cam follower 30, and which operates links 26 and 28 to hinge the jaws about stationary pivot pin 24. When pin 27 moves radially outwardly, the links 26 and 28 actuate jaws 20 and 22 to close them, and when the pin 27 moves radially inward the links actuate the jaws to open them.

The exact path of the cam track 32 is not critical as long as it provides a full open condition of the jaws in a cutter assembly 12 where the bottles 16 are fed into the debander 10 so the ends of the jaws can engage a bottle neck 15 above and below the pilferproof band on the neck, and a full closed position of the jaws somewhere prior to exit of the bottle from the debander so the band will be transversely cut and clamped by the jaws. The jaws are held in the closed condition as the bottle exits the debander so the severed band will be stripped from the bottle. The separated band is deposited in a scrap bin, not shown, when the jaws are opened by radially inward movement of the cam follower 30 as it continues around the cam track. When the jaws in a cutter assembly 12 are fully open, they remain so until the cutter assembly rotates to the bottle feed-in position where the jaws again begin to close at the start of another cycle.

FIG. 1 best illustrates jaws 20 and 22 in the open position on the left hand side of the figure, and in the closed position on the right hand side of the figure. FIG. 4 illustrates a separated band 14 clamped between a pair of closed jaws 20 and 22 preparatory to dropping the band in a scrap bin when the jaws are subsequently opened.

In order to insure proper cutting and clamping of a pilferproof band, it is desirable to be able to adjust the closed relationship of the jaws. This can be done by set screw 41 associated with each cutter assembly which extends through the gib plate on one side of the assembly with its end in abutment against the end of arm 49 on the yoke base 39. Adjustment of screw 41 changes the position of the yoke 36 in the rotary table 11 and therefore changes the location of pivot pin 24 with respect to cam follower 30 to control the degree of closing of the jaws.

It is also desirable to be able to remove a cutter assembly 12 or assemblies from a decapper 10 without completely dismantling a decapper. This is made possible by a removable section, not shown, in cam member 34 which permits the cam follower 30 on a cutter assembly 12 to be removed radially from the cam track 32 when gib plates 21 are removed from the rotary table to otherwise free a cutter assembly.

With six cutter assemblies 12 on the debander 10 as is illustrated and described herein, each cutter assembly removes a pilferproof band 14 from a bottle 16 during each rotation of the apparatus so that six bands are removed from six bottles during each 360° of rotation. With high speed rotation of the decapper, as many as 300 or more pilferproof bands per minute can be removed from a like number of bottles with this apparatus.

It is therefore seen that apparatus constructed in accordance with this invention is very useful in the preparation of returnable bottles for reuse. Although a preferred embodiment of this invention has been illustrated and described, it will be apparent to those skilled in the art that numerous modifications can be made in such embodiment without departing from the scope of this invention or the claims appended hereto.

What is claimed is:

1. Apparatus for removing pilferproof closure bands from the necks of returnable bottles comprising:

a rotary table with a plurality of cutter assemblies mounted in it, each of which includes a pair of pivotable jaws having outer ends which are adapted to be engaged against the neck of a bottle and a groove in a first jaw of said pair with outside corners along opposite sides of the groove, one of which is sharp and the other of which is dull, and outer edges along opposite sides of the second jaw in said pair with one of said outer edges being sharp for engagement against the sharp edge of the groove in said first jaw to cut a metal band therebetween, and the other edge being dull for clamping the band against the dull edge of said groove;

means for guiding bottles with pilferproof bands on the neck thereof into the apparatus to engage the outer ends of the jaws in a cutter assembly against a bottle neck with the open jaws on opposite sides of the band on the neck; and means for operating said pair of jaws in each cutter assembly to close the jaws against the band on the bottle neck to sever the band and clamp it between the jaws for removal from the bottle neck and deposit at a predetermined location when the jaws are subsequently opened.

2. Apparatus as set forth in claim 1 in which each of said cutter assemblies is resiliently mounted in said table for resilient engagement of the outer ends of said jaws against a bottle neck.

3. Apparatus as set forth in claim 1 which includes resilient means for engagement against a pilferprof band on a bottle neck on the opposite side thereof from the cutter assembly.

4. Apparatus as set forth in claim 2 in which said jaws are interconnected at a common pivot and one of said jaws is slotted at said common pivot and connected to the other blade through a resilient means which urges the resiliently mounted jaw radially outwardly with respect to said table for resilient engagement of the outer edge of such jaw against a bottle neck.

5. Apparatus as set forth in claim 1 which said jaws are connected at a common pivot and also through a pair of mechanical link members which have a common pivot which is also connected to a cam follower in a cam track which causes the cam follower and pivot pin to move radially with respect to said rotary table to open and close said jaws.

6. Apparatus as set forth in claim 1 in which said rotary table is adapted to be adjusted vertically for positioning said cutter assemblies at the proper position with respect to the pilferproof bands which are to be removed from bottle necks.

7. Apparatus as set forth in claim 1 in which each pair of jaws is disposed in radially extending guideways in said rotary table.

8. Apparatus as set forth in claim 1 which includes a rotary star wheel and a guide track radially outward of said star wheeel for guiding the bottles along a path parallel to the travel of said cutter assemblies.

9. Apparatus for removing pilferproof closure bands from the necks of returnable bottles comprising:
   a rotary table with a plurality of cutter assemblies mounted in it including a pair of pivotable jaws having mating sharp edges for cutting a pilferproof band and mating dull edges for clamping the band to strip it from the container;
   means for guiding bottles with pilferproof closure bands on the neck thereof into the apparatus and around the rotary table with the cutter assemblies;
   and means for actuating each cutter assembly to sever the pilferproof band on each bottle neck and strip the severed band from the bottle neck as the bottle is guided around the table.

10. Apparatus as set forth in claim 1, wherein said bottle necks are generally cylindrical and wherein said outer ends of said jaws are concave facing a bottle neck to facilitate their engagement therewith.

11. In combination, apparatus for removing band means from liquid bearable vessels of the type adapted to receive removable cap means frangibly connected to said band means, including:
   snipping means comprising movable first and second jaw means defining first edge means for snipping open said band means and second edge means for releasably gripping said band means and removing same from one of said vessels wherein said first jaw means comprises a cutting edge portion and a spaced gripping edge portion and said second jaw means comprises spaced edge defining portions including a cutting edge portion and a gripping edge portion; said cutting edge portions and said gripping edge portions defining said first and second edge means, respectively;
   means for positioning said apparatus proximate said band means with said movable jaw means in abutment with one of said vessels in an initial open position; and
   means for moving said jaw means to a subsequent closed position to snip open said band means between said first edge means and grip said band means between said second edge means.

12. The apparatus as described in claim 11, additionally including means for moving said apparatus away from said vessel and automatically moving said jaw means to said initial position to thereby pull said band means from said vessel and release same after its removal.

13. In combination, apparatus for removing sealing band means from bottles, including:
   a plurality of snipping means, each comprising movable jaw means defining first edge means for snipping open said sealing band means and second edge means for releasably gripping said sealing band means and removing same from one of said vessels;
   means for sequentialy positioning each of said plurality of snipping means adjacent one of a plurality of bottles bearing sealing band means, with said movable jaw means in abutment with said vessel in an initial open position;
   means for moving said jaw means to a subsequent closed position to snip open said sealing band means between said first edge means and grip said sealing band means between said second edge means; and
   means for moving said apparatus away from said vessel and automatically moving said jaw means to said initial position to thereby pull said sealing band means from said vessel and release same after its removal.

14. The invention as set forth in claim 13, wherein means are provided for releasing said sealing band means at a predetermined position of each of said snipping means.

* * * * *